Aug. 18, 1970  R. R. GIARRETTO  3,524,207
OVER-THE-WING ACCESS STRUCTURE FOR SERVICING
MULTIPLE DOORS IN COMMERCIAL JET AIRCRAFT
Filed May 5, 1969  3 Sheets-Sheet 1
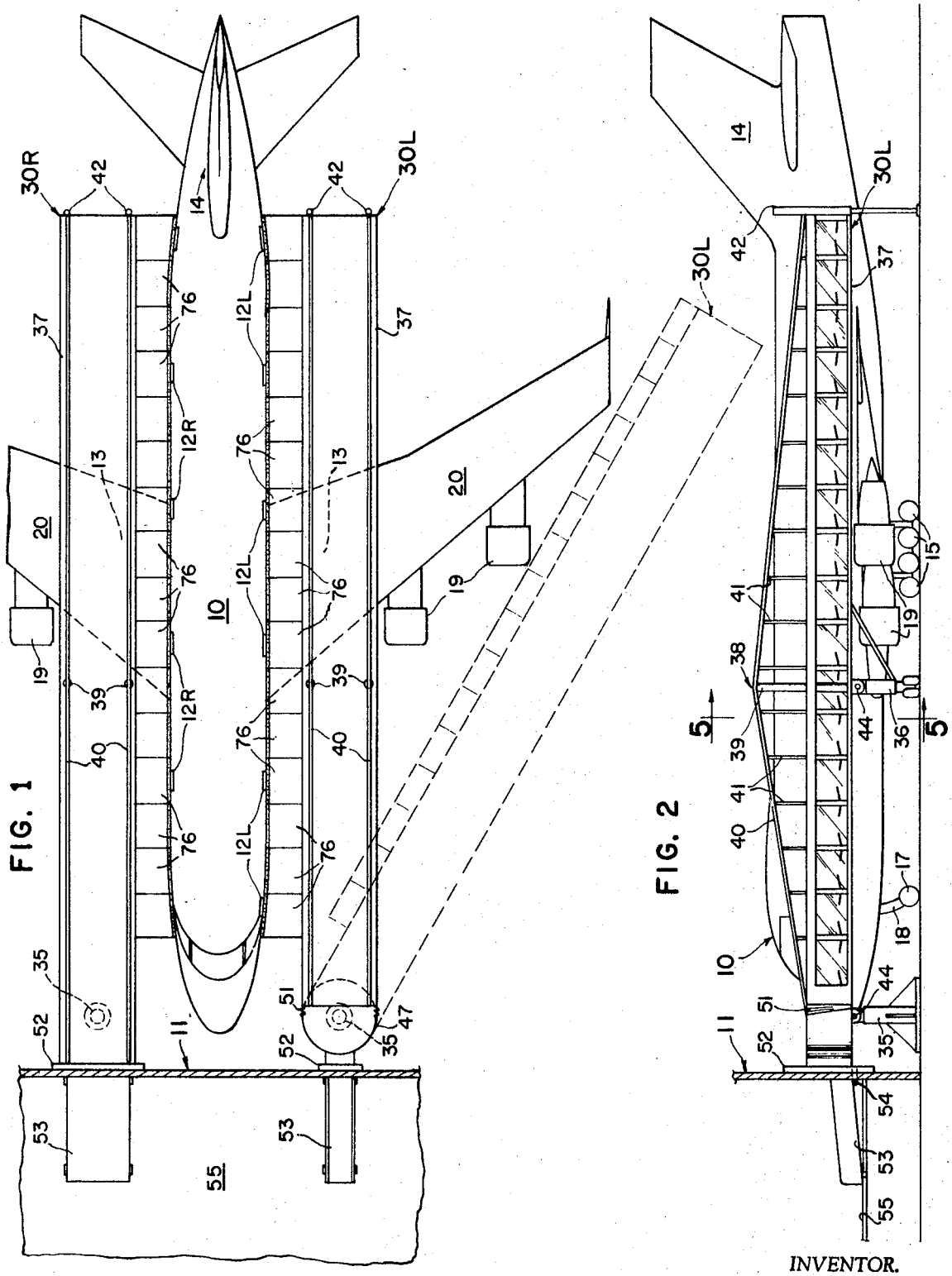
INVENTOR.
RALPH R. GIARRETTO
BY Fryer, Tjensvold, Feix,
Phillips & Lempio
ATTORNEYS

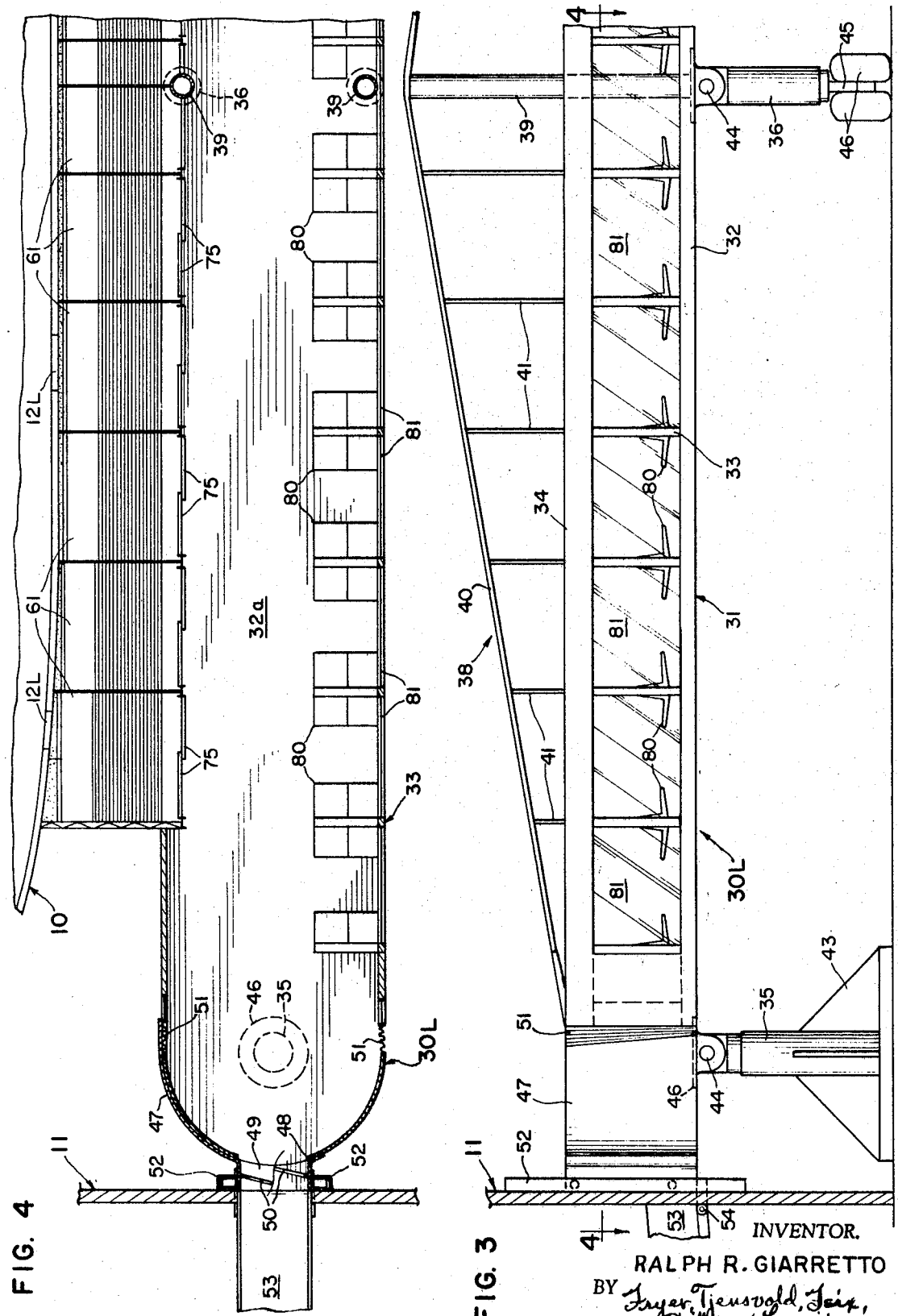

Aug. 18, 1970  R. R. GIARRETTO  3,524,207
OVER-THE-WING ACCESS STRUCTURE FOR SERVICING
MULTIPLE DOORS IN COMMERCIAL JET AIRCRAFT
Filed May 5, 1969  3 Sheets-Sheet 3
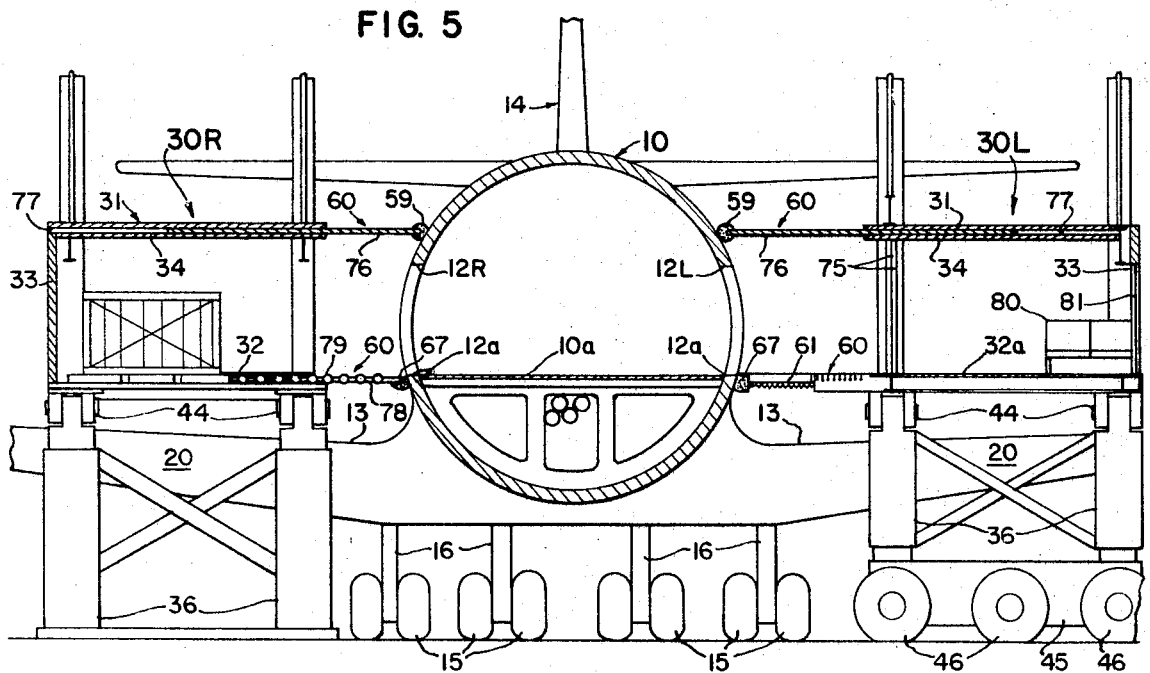
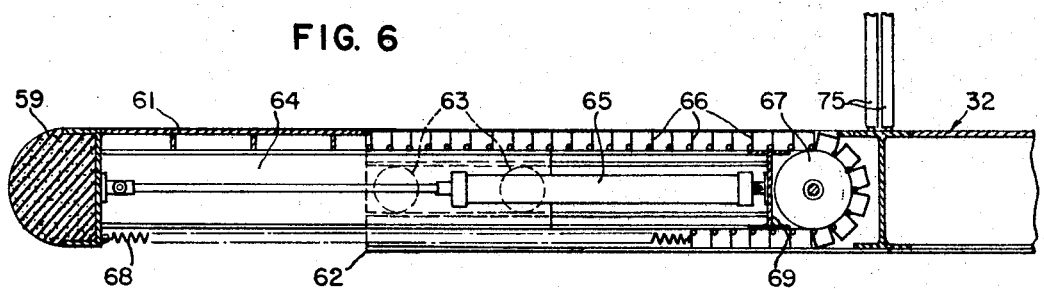
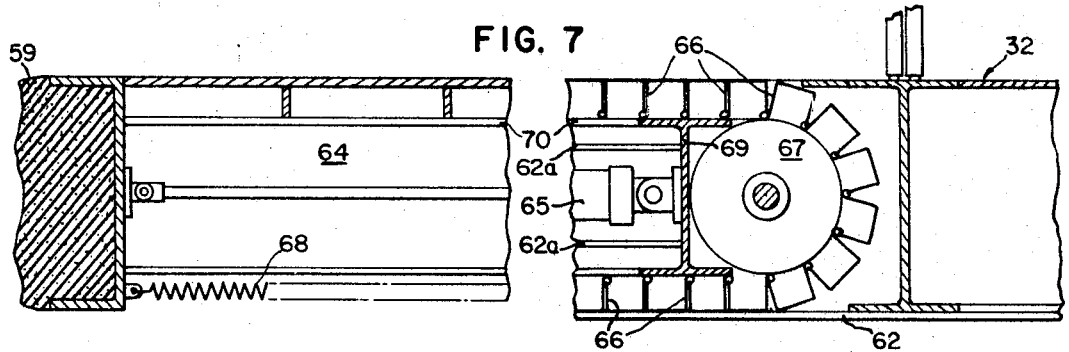
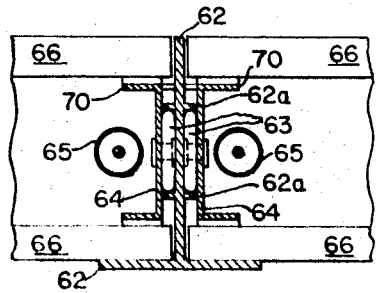
INVENTOR.
RALPH R. GIARRETTO
BY *Fryer, Tjensvold, Feix,*
*Phillips & Lempio*
ATTORNEYS

3,524,207
OVER-THE-WING ACCESS STRUCTURE FOR SERVICING MULTIPLE DOORS IN COMMERCIAL JET AIRCRAFT
Ralph R. Giarretto, 4034 Wilson Lane, Concord, Calif. 94521
Continuation-in-part of application Ser. No. 635,467, May 2, 1967. This application May 5, 1969, Ser. No. 821,818
Int. Cl. B65g 11/00
U.S. Cl. 14—71     15 Claims

ABSTRACT OF THE DISCLOSURE

Multiple access doors or hatches at spaced locations along sides of commercial jet aircraft can be serviced simultaneously with a common elongated structure which serves as a passageway and has two, spaced supports, one of which supports the structure at one end and the other of which supports the structure in its central portion, so a portion thereof is cantilevered in order that this portion can be positioned over an aircraft wing root when the structure is generally aligned with the longitudinal axis of the aircraft, whereby laterally extensible units can be extended from the structure to the aircraft to simultaneously service multiple doors or hatches that may be located ahead of the wing root, over the wing root and aft of the wing root.

---

This application is a continuation-in-part of this inventor's prior co-pending patent application, Ser. No. 635,467 filed May 2, 1967, now abandoned and claims the same subject matter as disclosed therein.

BACKGROUND OF THE INVENTION

In conventional commercial jet aircraft a number of access doors or hatches are normally located at spaced intervals along the longitudinal sides of the aircraft for passenger or cargo ingress and egress. Because these access doors are a considerable height above the ground, a variety of commercial access structures have been developed to provide more convenient access from the ground or terminal to the doors of the aircraft.

In passenger jet aircraft, it is desirable that the passengers be shielded or protected by enclosed structures extending from the terminal from the high noise level, disagreeable odors, jet wash and movement of support equipment on the aircraft parking apron. This has led to the development of a number of telescoping access structures having one end pivoted on the terminal building about which these units are swung so their vertically adjustable outboard end can be positioned to service a single access door in the side of the aircraft. Such a conventional structure is illustrated in U.S. Pat. 3,038,185 issued to Moore.

Due to the wing configuration of jet aircraft and the spaced longitudinal locations of the access doors in the sides of the aircraft, such conventional structures are unable to service more than one access door of the aircraft simultaneously. Further, many aircraft have additional access openings above the wing roots which are completely unserviceable by such conventional structures. Thus, unless two or more of these conventional telescoping access structures are employed, only one access door for ingress and egress is available between the terminal and the aircraft. Because space is at a premium in the parking apron adjacent to the terminal, it has become quite common to utilize only a single conventional telescoping access structure, for servicing only one of the access doors in the aircraft, since this allows the aircraft to be parked "nosed-in." As a result, all the passengers or cargo must move through a common access door, along with support personnel, food service containers, etc., which causes considerable congestion.

During some phases of the enplaning or deplaning through a single access door of a passenger jet aircraft, quick evacuation of the aircraft is nearly impossible. In fact, even orderly deplaning may require fifteen or more minutes to empty the aircraft through a single access door serviced by a conventional structure. Being unable to empty an aircraft quickly, especially in case a fire or other similar emergency, represents a major safety hazard to passengers on aircraft being serviced through a single access door. In fact, in a panic situation it is quite probable that quick evacuation would be impossible, without employing the various alternate emergency escape equipment on the aircraft, such as chutes, to allow the passengers to evacuate the aircraft through other access doors to the parking apron. This may be undesirable if a fire exists on the apron.

Obviously, space considerations on the parking apron at airports often prevent the parking of an aircraft in a manner in which more than one of the conventional telescoping units can be employed. Further, the sloped ramps formed by conventional telescoping structures are uncomfortable because of the rather steep angles which are employed and the walking surface include a series of ridges where the telescoping sections join, that represents a hazard to passengers using them. The above factors represent a real inconvenience to the passengers of commercial carriers, and a source of potential liability to both the airport and the individual carrier.

As indicated above, the telescoping loading and unloading structures of the conventional type utilize only the outer end of the passageway structure to connect to a single aircraft access door.

Thus, a primary object of the instant invention is to overcome such a limitation and to provide simultaneous servicing of multiple access doors in the aircraft through a single elongated passageway structure. This is accomplished by a cantilevered elongated structure having horizontally extensible floors and ceilings or pods from at least one side thereof to span to the aircraft thereby servicing multiple doors at several spaced longitudinal locations along one side of the aircraft. Normally, in order for this cantilevered structure to service the doors or hatches aft of the wing root, it is necessary that approximately one-half to three-quarters or more of the total length of the elongated structure be cantilevered so that it can extend over the wing root to these doors. Multiple compartments within the elongated structure may be employed to increase flexibility in traffic flow and passenger convenience.

A further object of the present invention is to develop an access structure which will allow higher density of aircraft on the apron adjacent to the terminal building proper while increasing accommodations through multiple door service and thereby decreasing the walking distance to and from the main terminal.

Also, it is an object of the present invention to provide access structure having pre-staging passenger seating within the access structure itself, thereby increasing the lounge areas now used for pre-staging activities and the necessity of expanding them.

Many of the above objects can be accomplished through the present invention by a cantilevered, access elongated structure which can be used for movement of passengers and/or cargo simultaneously through multiple access doors of the aircraft with only one common elongated passageway structure. The elongated passageway structure, according to this invention, is preferably vertically adjustable on both its supports so it elevates and lowers in a generally level manner and through ramps connecting one end with the terminal, provides a unique bridging and connecting system for providing passenger ingress and egress between the terminal and multiple doors in the aircraft.

In addition, the large size passageway formed by the cantilevered structure, and through it, the servicing of multiple access doors in the side of the aircraft simultaneously, increase efficiency in passenger enplaning and deplaning operations, thereby decreasing the turn around time of the aircraft. Further, through the use of certain embodiments of the novel over-the-wing structure of the invention, an improved flow and irculation of passengers can be effected by providing a pre-staging area wherein passengers awaiting enplaning can be seated, while awaiting the final boarding process. Further, the pre-staging areas can be further divided into the various classes and each class can enter the aircraft through a separate access door in the aircraft, which is highly desirable for orderly flow of passengers and convenience.

The instant invention represents a departure from the present telescoping access systems, previously mentioned, by employing a structural assembly designed and engineered specifically to cantilever over the wing root of the aircraft when it is nosed into the terminal. When so positioned, structures laterally extended from the side of the elongated structure to the aircraft provide bridgeways over which passengers and/or cargo can enter or leave the aircraft through multiple access doors simultaneously. By this arrangement, one common passageway structure accommodates the use of multiple access or service doors along one side of the aircraft, including doors located over the wing roots which have hitherto been unusable for passenger ingress and egress.

The cantilevered access structure itself may include a specially designed steel frame arrangement which incorporates a special arranged steel box stress principle of either a Vierendeel (vertical) or basic Warren (diagonal) or other forms of structural principles of cantilever. Often this access structure will require 30' to 80' of unobstructed cantilever to extend over the wings of the larger aircraft in order that the door aft of the wing can also be serviced. Alternates to the above systems for support of this cantilevered portion, are cables or tension rods from overhead structures which can be used separately or in combination for supporting it in order that the elongated access structure may be generally aligned along the side of the aircraft, whereby the selection of any of access doors in the aircraft is made possible.

To achieve the desired objectives, the cantilevered access elongated structure is vertically supported above the ground and usually made adjustable vertically on a system of two spaced adjustable strut systems. The end strut is located adjacent to the terminal building at one end of the new access structure and can serve as a pivot as well as provide the necessary vertical movement for its associated end. Since this strut also serves to counteract the uplifting moments from the cantilevered section, it must be stable in both directions of vertical adjustment. The outboard vertically adjustable strut or central area strut is also designed for precise vertical adjustment and may work simultaneously with the other strut, whereby the elongated access structure is moved vertically in a substantially level manner. Obviously, each individual strut may function independently of the other to achieve flexibility and to align the access structure along the longitudinal axis of the aircraft. This central strut can be anchored to the ground or alternatively can be supported on a roller or wheel system which may be self-driven or pulled so as to swing the whole cantilevered structure about the pivot formed by the end strut, whether or not they are vertically adjustable. Through the use of the roller or wheel system the access structure can be swung to a position adjacent to the terminal building to increase clearances during parking the aircraft.

However, the cantilevered access structure can remain perpendicular to the terminal building in order to increase the apron space for the highest aircraft density on the aircraft apron. In this case, it is merely raised vertically above the normal service level or position prior to the arrival of the aircraft. Once the aircraft has arrived and taxied or been positioned so that the cantilevered portion is over one of its wing roots with the access structure longitudinal axis generally parallel with that of the airplane, the access structure is lowered in a level manner (three to six feet) in order to bring the access structure to the position that the laterally (horizontally) extensible members from the sides of the access structure can register with all of the aircraft entry or door sills. Normally, the control of the access structure is accomplished by an operator at the control panel station located in the middle of the access structure, whereby an unobstructed view will be available for achieving the movement of the nesting structures (laterally extensible members) with the aircraft as they are horizontally extended to bridge the gap between the structure and the aircraft.

The operator can adjust both struts uniformly or independently for flexibility in vertical adjustment in order to accommodate proper registry with aircraft door sills. When the multiple door sills are generally aligned with longitudinal axis of the structure, lateral nesting structures are laterally extended to contact the sides of the aircraft through the use of pneumatically powered systems (or other types) to provide a final bridging section between the cantilevered access structure and the aircraft.

Asphaltic styrofoam rubber bumpers four to six inches in thickness or more, can be incorporated on the leading edges of the horizontally extensible member which contact the aircraft. These bumper-like structures seal the top, bottom and sides leading edges of each horizontally extensible structure and prevent the ingress of the elements into the bridging corridor so formed. In addition, these bumper systems protect the surface of the aircraft from any possibility of damage. In place of the rubber bumper previously described, this function may also be accomplished with inflatable pneumatic boots which are inflated after the leading edges of the nesting units are properly positioned relative to the aircraft.

Rubber bumpers or inflatable pneumatic boots are employed so that the extensible structures can effect a sealing engagement with the aircraft surface contours. Obviously, utilization of such sealing systems will allow for variation in aircraft types, variation of contour and for inaccuracies in parking or positioning the aircraft relative to the cantilevered access structure. Various types of extensible structures can be employed, either those forming a continuous contact along the sides of the aircraft or, alternatively, those employing a plurality of multiple shorter extensible sections which are adjustably located in the side(s) of the elongated structure in order to effect a proper registry of the doors of the aircraft.

To provide total protection to the aircraft wing roots over which the cantilevered portion of the access structure extends, a system of rubber bumpers and pressure sensors (switches) are provided on the underside of the access structure to protect the wing roots from structural damage. Thus, if any contact pressure is sensed with the wing root, it will automatically trigger fail-safe systems stopping the mechanism lowering the structure and an unsafe signal will appear at the operator's control panel.

When a continuous foyer or corridor is formed, a plurality of longitudinally sliding doors which telescope with one another along one side of the access structure can be positioned to provide individual boarding areas at the several spaced door locations along the sides of the aircraft. Alternatively, a bellows-like collapsible structure could be employed in place of these doors. Curtains or similar structures could also be used to help form closed corridors.

SUMMARY OF THE INVENTION

The advantages outlined above as well as others are obtained with an over-the-wing access structure for simultaneously serving multiple access openings in commercial jet airliners comprises an elongated passageway structure having an aperture in one end for ingress and egress from a terminal, an end support means vertically supporting one end of said elongated structure adjacent to its apertured end and ramp means joining to the aperture and connecting it to a terminal, central area support means vertically supporting said elongated structure in its central portion so that a substantial portion of said elongated structure is cantilevered, and laterally extensible bridging means in at least one longitudinal vertical side of said elongated structure said bridging means being located on both sides of the central support means whereby a plurality of bridgeways to several access doors in said aircraft are provided when said extensible members are extended. The instant access structure can employ a number of rubber bumpers, both on the horizontally extending structure and underneath the cantilevered portion, to protect the skin of the aircraft. In addition, the end of the elongated structure vertically supported on the end support means may include a pivot and central support means supporting the central section of said structure provided with wheels or rollers so that the system can be swung relative to the pivot to increase the clearance with the aircraft. Further, the access structure itself can serve as a pre-staging area wherein passengers embarking on a flight may be pre-staged for quick and efficient boarding. Various systems can be employed to afford multiple lateral bridging sections between the elongated structure and the aircraft doors. These units can be mounted to be adjustable on the elongated structures for achieving registry with the individual doors. Both the end support means and the central support means may include vertical adjusting means.

BRIEF DESCRIPTION OF THE DRAWINGS

The above invention along with its objectives and advantages will be better understood by reference to the accompanying drawings wherein:

FIG. 1 is a plan view of the parking apron adjacent to a terminal building with two of the over-the-wing access structures aligned with the fuselage of an aircraft and in their "service position" whereby multiple doors on opposite sides of the aircraft provide ingress and egress thereto;

FIG. 2 is an elevation of novel over-the-wing access structure illustrated in FIG. 1;

FIG. 3 is an enlarged elevation of the novel over-the-wing access structure illustrated in FIG. 2 with its outboard end section broken away;

FIG. 4 is a horizontal section taken along line 4—4 of FIG. 3;

FIG. 5 is a vertical section taken along line 5—5 of FIG. 2;

FIG. 6 is a vertical section of the laterally extensible and retractable floor sections which are extended from a side of the over-the-wing access structure to the fuselage;

FIG. 7 is an enlarged section of the floor section illustrated in FIG. 6 with parts broken away to show enlarged detail;

FIG. 8 is another section of the floor section showing the details of drawer-like slide members forming the telescoping parts of these sections; and FIG. 9 is a broken away section of the U-shaped interlocking channel members which form the walking surfaces when the floor sections are extended to the aircraft to bridge the gap between the parallel aligned fuselage and over-the-wing access structure when the latter is in the "service position."

DETAILED DESCRIPTION OF THE INVENTION

For a general understanding of the instant invention, reference is made to FIGS. 1 and 2 wherein a large aircraft 10 is illustrated parked nosed into a terminal building 11. Access doors or hatches 12 are located in a conventional manner at spaced intervals along both sides of the fuselage with those on the right side designated as 12R and those on the left side 12L. Several of the access doors on both sides are located over the wing roots 13 of the aircraft while others are located aft of the wing roots closer to the empennage section 14 of the aircraft. Normally, the aircraft would be taxied or towed into the position illustrated in FIGS. 1 and 2 with chocks placed ahead and behind the wheels 15 of its landing gear 16. The nose wheel 17 supported on a steerable strut 18 is not normally restrained. The aircraft illustrated is representative of the jumbo versions of the large jets in current commercial service and designs for future models which may have more or less access doors 12 on opposite sides of the fuselage than illustrated in the drawings. Such aircraft have their jet engines 19 suspended under attached wings 20 as illustrated.

In FIG. 1 two of the novel elongated access structures 30 are shown servicing the aircraft 10, one access structure 30R on the right side and another access structure 30L on the left side of the fuselage with the access structure on the right side being supported on stationary supports while the access structure on the left side being supported on a wheeled support and swingable so the clearance between the elongated access structure and the wing 20 of the aircraft can be increased during movement of the aircraft into or out of the service area. Also, the support units or struts for both access structures 30R and 30L can be vertically adjustable, if desired, for increasing structure-to-plane clearance and achieving accurate alignment with the longitudinal axis of the aircraft, as described infra. Other techniques can be employed to increase the wing-to-structure clearance especially for the portion of the access structure that extends across the top of the wing.

In FIG. 3 a preferred embodiment of the novel access structure is illustrated. The basic unit of the access structure is an elongated hollow-shell structure 31, usually rectangular in cross-section, which includes a bottom 32, two sides 33 and a top 34 and is of sufficient size to provide a large, convenient passageway for persons walking through the shell structure on its floor 32a. This elongated shell structure may employ box truss principles for high strength to weight ratios and is preferably completely fireproof and coated with fire-retardant coatings.

The elongated shell structure 31 is disposed horizontally and supported vertically above the ground adjacent to terminal building 11 on an end support strut 35 secured to the ground closely adjacent to the terminal and also by a central support strut 36 located under the central area or portion of the shell structure, as can be seen in FIG. 2, so a substantial portion of the shell structure forms cantilevered section 37 extending outboard from the several support struts. As previously indicated, the length of cantilevered section may be from 30 feet to 80 feet depending on the distance from the leading edge of the wing root 13 to the door 12 furthest aft of its trailing edge to be served through the novel access structure 30. As shown in the drawings, the central strut may be located closer to the end strut than the outboard end of the shell structure. Thus, this central strut can be defined as being in the "central area" of the shell structure. However, as the spacing between these two struts decreases, the lever moment of the cantilevered section 37 increases substantially.

In view of the substantial cantilever, it is desirable to employ overhead support systems for this cantilevered section 37 of the shell structure 31. Such a support truss system 38 can be seen in FIGS. 2 and 3 where vertical support post structures 39 extend upward from the top of the shell structure to tie rods or cables 40 connected across the tops of these support posts to the opposite ends of the shell structure forming a triangular truss system. Vertical stringers 41 can be connected between the shell structure and the rods or cables, at intervals, as illustrated. The support posts extend downwardly to the central support strut 36 which carries the compressive loads.

Since considerable loading of the cantilevered section 37 of the shell structure 31 can occur, especially when moving cargo to access doors 12 aft of the trailing edge wing root 13 a retractable outrigger support 42 may be attached to the outboard end of the shell structure 31 and lowered to the ground to stabilize the end of the shell structure after the aircraft has been parked and during such loading operations. Obviously, it must be retracted when the aircraft is being moved to or from the service area. In addition, if support struts 35 and 36 are of the vertical adjusting type, the outrigger support must be slaved to their movement as discussed hereafter. Use of the outrigger support can reduce the size of the overhead supporting structure appreciably, since it provides additional support for the cantilevered section when it is heavily loaded. However, for normal passenger ingress and egress to an aircraft using the novel access structure, the outrigger support would not be required and is usually omitted.

Referring again to FIGS. 2 and 3 and to FIG. 5, it should be appreciated in view of the above discussion that the base 43 of the end support strut 35 must be permanently secured to the ground to resist the up-lifting moments caused by cantilevered section 37. Normally, both support struts 35 and 36 will be vertically adjustable jacks of the hydraulic or screw type so the shell structure 31 can be raised or lowered in a level manner. In addition, these struts are normally connected to the shell structure through pivoted connections 44 so the longitudinal axis of the shell structure can be changed relative to horizontal by disproportionate vertical movement of the several support strut systems for alignment with the passenger deck 10a in the fuselage of the aircraft.

The importance of vertical adjustment of both ends of the shell structure, or alternatively vertical adjusting units on the bridging units (discussed infra) connecting it with the aircraft, can be appreciated when it is recognized that an aircraft will move several feet vertically on its landing gear as it is loaded or unloaded. Thus, the vertical adjustment of the support struts 35 and 35 will allow shell structure to "float" with the aircraft as its load changes, so it maintains a registry with the passenger deck 10a. Obviously, both ends of the shell structure must move if this type of vertical adjustment is used since bridging units are required to be in registry with the bottom sills of access doors at spaced intervals along the fuselage of the aircraft which lead to the passenger deck.

As can be seen in FIG. 5, central support strut 36 can be composed of compound jacking units either secured to the ground so they are stationary, or alternatively supported on a truck 45 with wheels 46 so the shell structure can be swung away from the side of the fuselage. When the central support strut is supported on a truck, the end support strut will include a pivot 46 so the shell structure can be swung about this pivot. As can be seen in FIGS. 3 and 4, the pivoted end of the shell structure includes a rounded end 47 having an aperture 48 which registers with passage 49 with closable doors 50 when the novel structure is aligned along the side of the fuselage. Expandable bellows side panels 51 connecting the rounded end with the shell structure allow for minor adjustment in aperture registry with the passage 49.

If end support strut 35 is vertically adjustable, passage 49 is connected to a frame 52 which is slidably mounted about an opening in the face of the terminal building 11 so a ramp section 53 connected with pivots 54 to passage 49 can extend into terminal to its floor 55, as illustrated in FIG. 2, for providing ingress and egress to the shell structure. Obviously, this ramp section can be oriented at right angles to the elongated shell structure to increase its length and lessen the slope, if desired.

Referring to FIG. 1, ramp section 53 of structure 30R is illustrated as being similarly constructed but without the pivoting end unit, illustrated in FIGS. 2, 3 and 4.

From the foregoing description, it can be appreciated that the unique access structure is generally aligned along the side of the fuselage of an aircraft so it is parallel with the fuselage but spaced a short distance therefrom. To bridge this short distance or gap between the shell structure 31 and the fuselage, laterally extensible and retractable members 60 are incorporated in at least one side of the shell structure so that they can be extended or retracted.

Many different types of extensible and retractable units can be employed. In FIGS. 6, 7 and 8, the details of the extendable floor units 61 are shown in detail. A plurality of these units are employed and each includes several inverted T-supports 62 which cantilever outwardly from one side of the shell support structure. Guide rollers 63 are mounted on channels 64 which provide telescoping support for the channels on the T-support through ledges 62a, when the channels are extended and retracted by pneumatic jacks 65. On the outboard ends of each pair of channels between two adjacent T-supports is fixed a cross channel which contains a rubber bumper 59 of asphaltic styrofoam or other types which will protect the skin of the aircraft when contact occurs with the laterally extensible units. When pneumatic pressure is used to extend the jacks, a constant engaging pressure with the aircraft skin can be achieved.

As the channels 64 are extended, a plurality of interleaved U-shaped interlocking channel members 66 (see FIG. 9) track around guide roller 67 and form a continuous floor section without ridges. A spring 68 is connected to the free end of the connected U-shaped channel members which acts to return them to the storage area beneath the extendable channels 64 during retraction of a unit.

Because the U-shaped channel members 66 are interlocked with one another, so they hinge only in a single direction, supporting them on an I-beam member 69 and the top sides 70 of extensible channel 64 will form an adequate floor support for passenger traverse. In the illustrated embodiment, a plurality of the laterally extensible units 61 are employed to form a continuous bridging ramp along one side of the aircraft. However, it should be appreciated only the units in the vicinity of the access door 12 need be extended and through the use of a series of telescoping doors 75, forming the side 33 of the shell structure adjacent to the laterally extensible units, openings in the side of the shell structure aligned with the access doors in service can be established.

Since the extensible floor units 61 do not retract under the floor 32a of the shell structure 31, they can be connected with a slight downward slope to increase the structure-to-wing clearances. In the embodiment shown in FIGS. 6, 7 and 8 the extensible floor units do not fully retract under the shell structure, but retract to approximately one-half their fully extended length. However, in the freight embodiment shown on the left side of FIG. 5 the floors retract fully under the shell structure.

A ceiling over the floor bridging unit 61 can be formed by a plurality of simple telescoping panels 76 which are reciprocated in a recess 77 between the separated portions of the top 34 of the shell structure 31 (best seen in FIG. 5). In some instances where cargo is being handled, a telescoping floor section 78 with incorporated rollers 79 may be employed (see FIG. 5) which can be retracted under the floor 32a of the shell structure in a space provided for this purpose.

As can be appreciated, the bottom sill 12a of the several access doors 12 in the fuselage along both sides of the aircraft are aligned with the passenger deck 10a and due to variation in the height of the nose strut 18 of aircraft 10 and its instantaneous loading, a line intersecting these several sills may vary appreciably relative to horizontal and change in height above the ground. Thus, by adjusting both support struts 35 and 36, the leading edges of the laterally extensible members 61, containing the rubber bumper 59, can be made to simultaneously register with the sill of each individual door being serviced so dangerous off-sets in registry will not occur, and the access structure will "float" with the aircraft as it moves.

Other techniques, such as individual pods mounted on the side of the elongated shell structure, so they are longitudinally slidable to align with the individual access door 12, are within the contemplation of the invention. Such pods would be constructed to be extensible and retractable as is the bridging units previously described. If the elongated shell structure 31 is not supported on vertically adjustable support struts, the leading edges of the pods contacting the aircraft would have to be vertically adjustable to achieve proper registry with the spaced bottom sills of the door they are servicing and adapted to move with the aircraft as the load changes and it moves on its landing gear.

Since the shell structure 31, at least in the area between the two support struts 35 and 36 is well supported, it can include lounge areas for pre-staging passengers with seats 80 provided to accommodate them in these pre-staging areas. Also, windows 81 of high strength glass may be utilized both to admit light and to view of operations occurring on the adjacent apron can be used for one side 33 of the access structure. These lounge areas, incorporated into the access shell structure itself, will increase the seating capacity of pre-staging areas in current terminals and allow a more orderly flow of passengers to and from the aircraft being serviced.

I claim:

1. A cantilevered aircraft access structure for simultaneously servicing multiple access doors spaced along the sides of commercial jet aircraft comprising:
   an elongated passageway structure suitable for the passage of cargo or people therethrough;
   end support means adjacent to one end of said structure and supporting it vertically above the ground;
   central support means located in the central area of said elongated structure and supporting it vertically above the ground whereby a substantial portion of said elongated structure is cantilevered so it can extend over the top of a wing of a commercial aircraft when said elongated structure is generally aligned with the fuselage of the said aircraft;
   corridor means connected to said elongated structure and to a terminal to provide communication for people and cargo to said elonagted passageway structure;
   a plurality of aperture means located in at least one side of said elongated passageway structure operable to form a plurality of side ingress and egress openings at longitudinally spaced intervals along said one side of said elongated passageway structure; and
   laterally extensible and retractable means attached to the lower portion of said elongated passageway structure adjacent to each side ingress and egress opening formed by said aperture means operable when extended to form bridging members between each side ingress and egress opening and an adjacent access door in an aircraft along said elongated passageway structure whereby access doors of said aircraft in front of the wing root, over the wing root and aft of the wing root may be selected for simultaneous service through said elongated passageway structure.

2. The cantilevered aircraft access structure as defined in claim 1 wherein the elongated passageway structure includes seating means for pre-staging passengers within said structure.

3. The cantilevered aircraft access structure as defined in claim 1 wherein control means are included to extend and retract said laterally extensible and retractable means.

4. The cantilevered aircraft access structure as defined in claim 1 wherein the laterally extensible and retractable means consist of floor sections and ceiling sections both which can be horizontally extended from a substantial longitudinal portion of a side of the elongated passageway structure having the plurality of aperture means and which in an extended position contact an adjacent aircraft forms a continuous closed bridging member across which spaced access doors in the side of said aircraft may be simultaneously serviced.

5. The cantilevered aircraft access structure as defined in claim 4 wherein the aperture means includes adjustable compartmenting means whereby the continuous closed bridging means may be isolated from ingress and egress except in the areas of the spaced access doors in the side of the aircraft being serviced.

6. The cantilevered aircraft access structure as defined in claim 1 wherein the laterally extensible and retractable means includes adjusting means whereby their outboard leading edges can be vertically adjusted to achieve registry with the bottoms of the individual access doors along the side of the aircraft being serviced.

7. The cantilevered aircraft access structure as defined in claim 1 wherein the laterally extensible and retractable means includes at least two separate spaced apart bridging members at least one of which bridging members being located in the cantilevered portion of the elongated passageway structure.

8. The cantilevered aircraft access structure defined in claim 1 wherein controllable clearance means are included to increase the clearance between the cantilevered portion of the elongated passageway structure and the wing of aircraft to be serviced through said elongated structure during the period the aircraft is being positioned for service through said cantilevered aircraft access structure.

9. The cantilevered aircraft access structure as defined in claim 8 wherein the controllable clearance means includes a mobile dolly under the central support means and a pivoted connection between the elongated passageway structure and the end support means whereby said elongated passageway structure may be swung clear of the aircraft parking area during positioning of said aircraft for service to insure adequate wing-to-structure clearance.

10. The cantilevered aircraft access structure as defined in claim 7 wherein the individual bridging members are slidable lengthwise of the elongated structure for adjustment for vertical registry with access doors in the aircraft being serviced.

11. The cantilevered aircraft access structure as defined in claim 1 wherein the extreme outboard end of the cantilevered section of the elongated passageway structure has connected thereto a vertical extensible and retractible outrigger support whereby said extreme outboard end of said cantilevered section may be stabilized subsequent to the final positioning of said elongated structure for servicing the aircraft by extending said outrigger support to the ground aft of the wing of said aircraft.

12. The cantilevered aircraft access structure as defined in claim 1 wherein the end support means and the central support means both include vertical adjusting means whereby the elongated passageway structure may be raised and lowered to achieve wing-to-structure clearance and to achieve better alignment with the longitudinal axis of the aircraft positioned along its side to achieve better registry of the laterally extensible and retractable means forming the bridging member with the access doors, said vertical adjusting means also operates to raise and lower said elongated passageway structure for servicing different models or aircraft.

13. The cantilevered aircraft access structure as defined in claim 12 wherein the corridor means connected to the elongated passageway structure and the terminal to provide communication for people and cargo includes terminal attaching means on said elongated passageway structure and terminal to accommodate the vertical movement of said elongated structure relative to said terminal.

14. The cantilevered aircraft access structure as defined in claim 12 wherein each vertical adjusting means includes hydraulic jacks.

15. The cantilevered aircraft access structure as defined in claim 12 wherein each vertical adjusting means includes screw jacks.

References Cited

UNITED STATES PATENTS

| | | | |
|---|---|---|---|
| 2,714,735 | 8/1955 | Watson | 14—71 |
| 3,099,847 | 8/1963 | Lodjic | 14—71 |
| 3,315,291 | 4/1967 | Wollard | 14—71 |

JACOB L. NACKENOFF, Primary Examiner